//page 1

United States Patent [19]
Shimanckas

[11] 3,797,274
[45] Mar. 19, 1974

[54] STERN DRIVE UNIT WITH BELLOWS ENCLOSED REVERSING TRANSMISSION AND UNIVERSAL COUPLING STEERING CONTROL

[75] Inventor: William J. Shimanckas, Waukegan, Ill.

[73] Assignee: Outboard Marine Corporation, Waukegan, Ill.

[22] Filed: July 18, 1972

[21] Appl. No.: 272,761

Related U.S. Application Data
[62] Division of Ser. No. 139,555, May 3, 1971.

[52] U.S. Cl................................ 64/16, 64/17 SP
[51] Int. Cl................................................ F16d 3/44
[58] Field of Search...................... 64/16, 17 SP, 2 P

[56] References Cited
UNITED STATES PATENTS

| | | | |
|---|---|---|---|
| 2,219,591 | 10/1940 | Hiestea | 64/16 |
| 2,402,006 | 6/1946 | Anderson | 64/16 |
| 2,641,115 | 6/1953 | Garrison | 64/16 |
| 2,841,967 | 7/1958 | Baker | 64/16 |
| 2,954,685 | 10/1960 | Cug | 64/16 |
| 478,811 | 7/1892 | Oehring | 64/16 |
| 2,659,217 | 11/1953 | Talbot | 64/16 |

FOREIGN PATENTS OR APPLICATIONS

| | | | |
|---|---|---|---|
| 436,123 | 10/1935 | Great Britain | 64/16 |
| 764,335 | 3/1934 | France | 64/16 |

Primary Examiner—Benjamin W. Wyche
Assistant Examiner—Randall Heald
Attorney, Agent, or Firm—Michael, Best & Friedrich

[57] ABSTRACT

Disclosed herein is a stern drive unit comprising a bellows enclosure defined by a bellows connected between a support adapted to be fixed relative to a boat hull and a tilt housing connected to the support for pivotal movement about a tilt axis, an input shaft extending in the support perpendicularly to the tilt axis, an output shaft journaled in the housing and extending perpendicularly to the tilt axis in generally co-planar relation to the input shaft, a propulsion leg which includes a rotatably mounted propeller connected to the output shaft and which is connected to the tilt housing for pivotal steering movement about an axis co-axial with the output shaft, a reversing transmission located within the bellows enclosure and connected to the input and output shafts for selectively controlling operation of the propeller and including an actuating lever located forwardly of the support, a shock absorber connected between the tilt housing and the support and extending, at least in part, within the bellows enclosure, and a steering control linkage connected to the steerable propulsion leg and extending, at least in part, in the bellows enclosure and including an actuating member located forwardly of the support, and a universal coupling located within the bellows enclosure and connecting two steering control shafts extending radially of the tilt axis.

3 Claims, 9 Drawing Figures

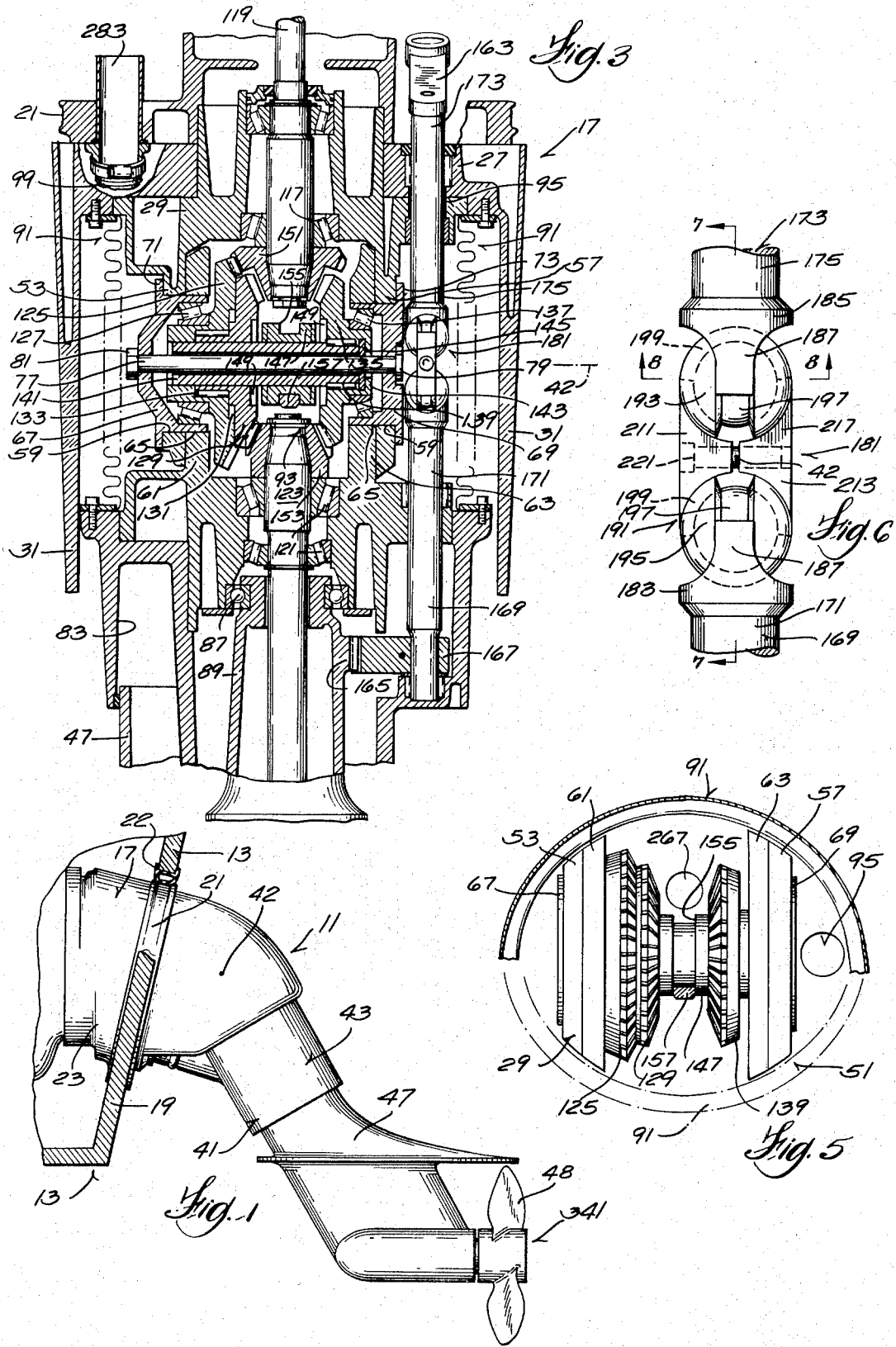

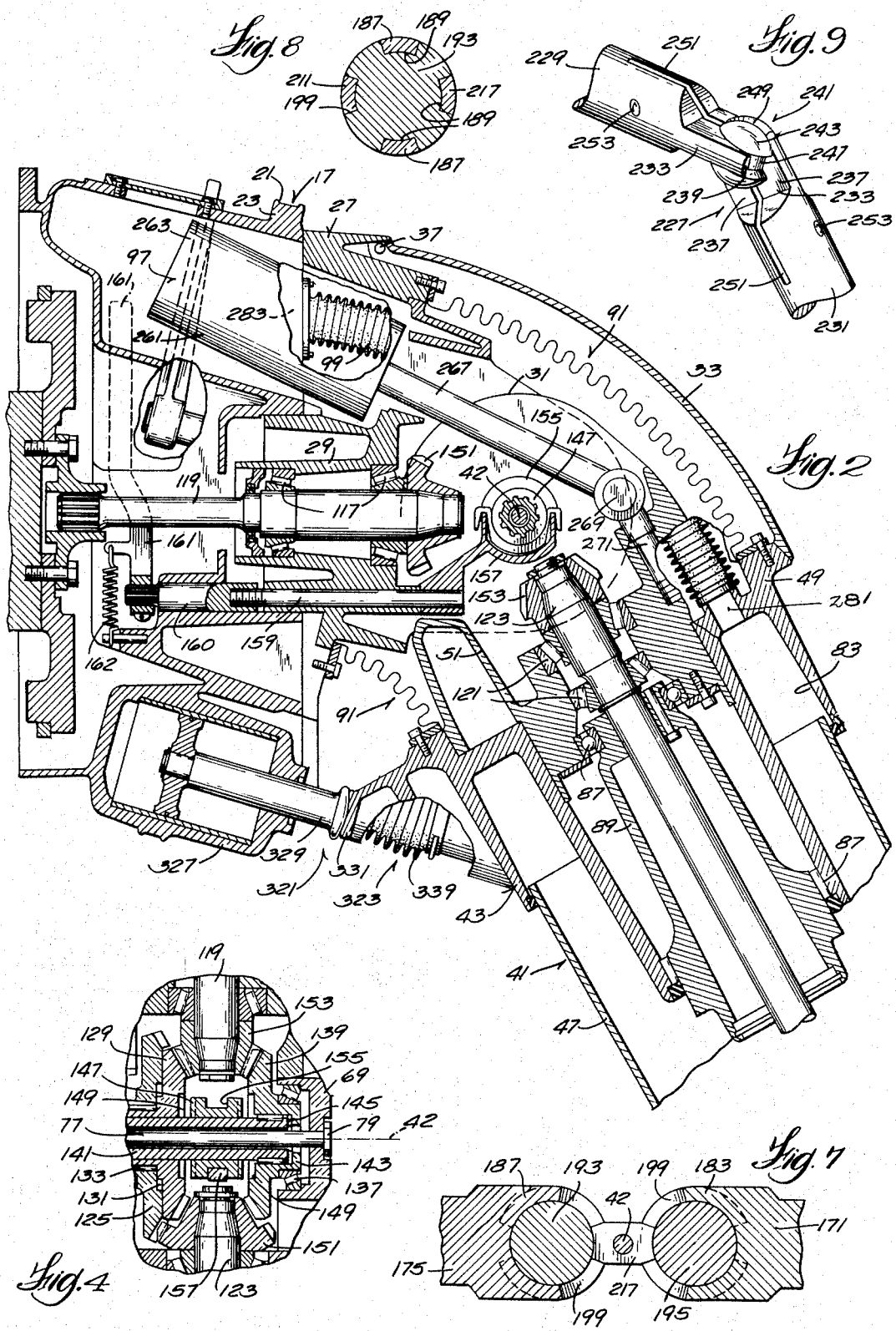

STERN DRIVE UNIT WITH BELLOWS ENCLOSED REVERSING TRANSMISSION AND UNIVERSAL COUPLING STEERING CONTROL

RELATED APPLICATIONS

This application is a division of my copending application Ser. No. 139,555, filed May 3, 1971.

This application relates generally to the subject matter of my earlier co-pending applications Ser. No. 811,829 filed Apr. 1, 1969; Ser. No. 844,457 filed July 24, 1969; Ser. No. 851,211 filed Aug. 19, 1969; Ser. No. 55,665 filed July 17, 1970, and my application entitled "Marine Propulsion Reversing Mechanism", application Ser. No. 132,401 filed Apr. 18, 1971.

BACKGROUND OF THE INVENTION

The invention relates generally to stern drive units which are adapted to be fixed relative to a boat hull and which include a vertically tiltable and steerable propulsion leg.

The invention also relates to marine propulsion reversing transmission and steering control systems. The invention further relates to a universal coupling which is well adapted for use in such steering control systems.

Stern drive units have been well known for several years. Examples of prior art stern drive unit constructions include, but are not limited to, the constructions disclosed in the following patents and patent applications:

Leipert U.S. Pat. No. 2,946,306 issued July 26, 1960,

Hansson et al. U.S. Pat. No. 3,006,311 issued Oct. 31, 1961,

Hamlyn et al. U.S. Pat. No. 3,051,119 issued Aug. 28, 1962,

Kiekhaefer U.S. Pat. No. 3,136,281 issued June 9, 1964,

Alexander U.S. Pat. No. 3,136,282 issued June 9, 1964,

McCormick U.S. Pat. No. 3,136,283 issued June 9, 1964,

North U.S. Pat. No. 3,136,284 issued June 9, 1964,

Kiekhaefer U.S. Pat. No. 3,136,285 issued June 9, 1964,

Kiekhaefer U.S. Pat. No. 3,136,286 issued June 9, 1964,

North U.S. Pat. No. 3,136,287 issued June 9, 1964,

Kiekhaefer U.S. Pat. No. 3,181,494 issued May 4, 1965,

Shimanckas U.S. Pat. No. 3,183,880 issued May 18, 1965,

Alexander U.S. Pat. No. 3,250,501 issued May 10, 1966,

Bergstedt U.S. Pat. No. 3,339,517 issued Sept. 5, 1967,

Wynne U.S. Pat. No. 3,376,842 issued Apr. 9, 1968,

Bergstedt U.S. Pat. No. 3,382,838 issued May 14, 1968,

Strang U.S. Pat. No. 3,489,120 issued Jan. 13, 1970,

Langley application Ser. No. 855,846 filed Sept. 8, 1969.

SUMMARY OF THE INVENTION

In accordance with the invention, there is provided a stern drive unit including a bellows which connects a support adapted to be fixed relative to a boat and a tiltable housing connected pivotally to the support. The bellows, together with the support and the tilt housing, defines a flexible enclosure containing the pivotable connection between the support and the housing, as well as a drive train including co-planar input and output shafts extending respectively in the support and in the tiltable housing, together with a reversing transmission connecting the input and output shafts and including rotary components mounted co-axially with the tilt axis between the support and the tilt housing.

The invention also provides for control of the reversing transmission by a lever which is located forwardly of the support and which is part of a control linkage extending through the support and into the bellows enclosure.

In the stern drive unit of the invention, the tilt housing has connected thereto a propeller carrying propulsion leg which is tiltable with the tiltable housing and which is steerable relative to the tilt housing about an axis which is co-axial with the output shaft and perpendicular to the tilt axis. In accordance with the invention, there is also provided a steering control linkage which includes a control member or lever located forwardly of the support and a pair of shafts which extend respectively in the support and in the tilt housing in radial relation to the tilt axis, which shafts are respectively connected to the control lever and to the steerable propulsion leg, and which are connected to each other within the bellows enclosure by a universal coupling including means for adjustably controlling back lash between the connected shafts.

Also in accordance with the invention, the bellows enclosure contains shock absorbing means comprising a cylinder pivotally connected to one of the support and tilt housing and a piston rod pivotally connected to an anchor on the other of the support and the tilt housing.

Still further in accordance with the invention, there is provided, exteriorly of the bellows enclosure, a flexible water conduit, operable notwithstanding tilting, and communicating with water ports in each of the support and tilt housing, whereby to afford supply to the engine of cooling water delivered from a pump in the steerable propulsion leg.

One of the features of the invention resides in the utilization of a flexible metallic bellows between a support fixable relative to a boat hull and a tilt housing pivotally connected to the support to define therebetween a flexible, lubricant containing gearcase having therein the pivotal connection between the support and the tilt housing, together with a reversing transmission, and at least a part of a steering control linkage.

Another of the features of the invention resides in the provision of a marine propulsion reversing transmission extending along a horizontal tilt axis and connecting an input shaft which extends at right angles to the tilt axis and an output shaft which extends in generally coplanar relation to the input shaft and can be angularly displaced in the common plane relative to the input shaft about the tilt axis. In accordance with still another feature of the invention, the components of the reversing transmission can be alternatively arranged so as to provide either a relatively high or relatively low output shaft speed for any given input shaft speed.

The invention also provides a universal coupling which is well adapted to serve as a part of the steering control linkage, and which has a high load carrying capacity, as well means for adjustably controlling back lash within the coupling. In this regard, the coupling comprises first and second members each having a fork-shaped portion including an inner concave surface and a section taken transversely to said concave surface and tapering outwardly in the radially outward direction with respect to the concave surface, together with a connecting unit having a first annular groove which has an inwardly tapering cross section and which receives the forked portion of one of the first and second members and a second annular groove which extends at a right angle to the first groove, which has an inwardly tapering cross section, and which receives the forked portion of the other of the first and second members. Either the connecting unit or the first and second members can include means for adjustably varying the back lash in the universal coupling. The high load carrying capacity of the coupling is provided by reason of the engagement of the forked portions in the grooves at substantial distances from the centers of the grooves.

One of the principal objects of the invention is the provision of a stern drive unit having a fore and aft input shaft and an output shaft which is tiltable in a vertical plane containing the input shaft and which is connected to the input shaft by a reversing transmission including rotatable components mounted co-axially with the axis of tilt between the input and output shafts.

Another of the principal objects of the invention is the provision of a bellows enclosure which extends between a support adapted to be fixed relative to a boat hull and a propulsion unit which is tiltably connected to the support for vertical swinging movement, which enclosure contains the pivotal connection between the support and the propulsion unit.

Another of the principal objects of the invention is the provision of a stern drive unit including a flexible bellows enclosure which is located about the horizontal tilt axis and which is defined by a support adapted to be fixed relative to a boat hull, a tilt housing pivotally connected to the support within the bellows enclosure for vertical swinging movement about a horizontal tilt axis, and a metallic bellows extending between and connected to the support and the tilt housing to provide a lubricant containing protective enclosure.

Another of the principal objects of the invention is the provision of a stern drive unit which combines the features of the preceding paragraph, together with input and output shafts and a reversing transmission as referred to in the third preceding paragraph.

Still another object of the invention is the provision of a stern drive unit including a bellows enclosure as set forth in the second preceding paragraph, which enclosure contains, at least in part, a shock absorbing system connected between the support and the tilt housing.

Still another of the principal objects of the invention is the provision of a stern drive unit including a bellows enclosure as set forth in the third preceding paragraph, and one or more flexible water conduits extending exteriorly of the bellows enclosure and communicating with ports in the support and in the tilt housing, whereby to provide for water delivery between the support and the tilt housing, notwithstanding tilting of the tilt housing relative to the support.

Still another principal object of the invention is the provision of a steering control arrangement for a steering propulsion leg mounted on a tilt housing for common tilting movement and for steering movement relative to the tilt housing, which arrangement extends through a bellows enclosure between a support and the tilt housing pivotally connected to the support and which includes a universal coupling located within the bellows enclosure and having means for adjustably controlling back lash between two connected shafts extending radially of the tilt axis between the support and tilt housing.

Still another object of the invention is the provision of a universal coupling capable of transmitting relatively large loads and including back lash adjusting means.

Another of the principal objects of the invention is the provision of a stern drive unit which is relatively economical to construct and which will provide reliable service over a long and useful life.

Another of the principal objects of the invention is the provision of a universal coupling which is economical to construct and which will provide reliable service over a long and useful life.

Other objects and advantages of the invention will become known by reference to the following description and accompanying drawings.

DRAWINGS

FIG. 1 is a side elevational view of a stern drive unit embodying various of the features of the invention.

FIG. 2 is an enlarged vertical section view, with parts broken away, of a portion of the stern drive unit shown in FIG. 1.

FIG. 3 is a top view shown in section with parts broken away and omitted, and with the output shaft in an elevated or generally horizontal condition.

FIG. 4 is a fragmentary view showing a modified arrangement for the gearing included in FIGS. 2 and 3.

FIG. 5 is a schematic sectional view of the gearing and associated supporting structure employed in the stern drive unit shown in FIGS. 1 and 2 and illustrating, in the upper half, the relation of the gearing and supporting structure to the bellows when the propulsion leg is in its lowermost position and illustrating, in the bottom half, the relation of the gearing and supporting structure to the bellows (shown in dotted outline) when the propulsion leg is in its most elevated position.

FIG. 6 is an enlarged elevational view of the universal coupling shown also in FIG. 3.

FIG. 7 is a fragmentary sectional view taken generally along line 7—7 of FIG. 6.

FIG. 8 is a fragmentary sectional view taken generally along line 8—8 of FIG. 6.

FIG. 9 is a perspective view of another embodiment of a universal coupling embodying various of the features of the invention.

GENERAL DESCRIPTION

Shown in FIG. 1 is a stern drive unit 11 which is adapted to be fixed relative to the transom of a boat hull 13 and drivingly connected to an internal combustion engine (not shown).

In general, the stern drive unit 11 comprises a support 17 which can be fixed relative to the boat hull 13 in any desired manner. For instance, the support 17 could be secured directly to a boat transom 19 or could be secured to the boat hull 13 independently of the transom 19. Although the support 17 is designed to extend through a hole in the transom 19 and includes an annular circumferential groove 21 to receive an annular inflatable transom sealing member 22 such as is disclosed in my co-pending application Ser. No. 55,665, filed July 17, 1970, in the specifically disclosed construction, it is contemplated to mount the support 17 to the boat hull 13 independently of the transom 19.

While other constructions can be employed, in the specifically illustrated construction, the support 17 comprises the assembly of a forward bracket or housing 23, an intermediate bracket or housing 27 which is bolted or otherwise fixed to the rear of the forward bracket 23, and an interior bearing support or fixed trunnion member 29 which is bolted or otherwise suitably fixed to the assembly of the forward bracket 23 and intermediate housing 27.

As shown in FIG. 3, the intermediate housing 27 includes a transversely spaced pair of rearwardly projecting wings 31 bridged (See FIG. 2) by a cover member 33 which is pivotally connected at 37 to the intermediate housing 27. The area between the wings 31 and below the cover member 33 contains the bellows enclosure still to be described.

Mounted on the support 17 is a propulsion unit 41 (see FIG. 1) which is connected to the support 17 by means affording vertical swinging movement of the propulsion unit 41 about a horizontal tilt axis 42. The propulsion unit 41 includes an upper or tilt housing 43 and a lower propulsion or steering leg 47 which includes a propeller 48 and which is connected to the upper or tilt housing 43 by means affording steering movement of the propulsion leg 47 relative to the upper or tilt housing 43 about an axis perpendicular to the tilt axis 42. While various constructions can be employed, the upper or tilting housing 43 includes the assembly of a main bracket or housing 49 (See FIG. 2) and a tilting trunnion member 51 which is bolted or otherwise fixed to the main bracket 49.

As a consequence, the support 17 (comprising the assembly of the forward bracket 23, intermediate housing 27 and fixed trunnion member 29) is fixed relative to the boat hull 13 and the propulsion unit 41 (including the propulsion leg 47 and the upper or tilting housing 43) is vertically swingable relative to the support 17. In addition, the steering or propulsion leg 47 is steerable relative to the upper or tilting housing 43 which is tiltable but not steerable.

Various means for pivotally connecting the support 17 to the tilting housing 43 can be employed. In the specifically disclosed construction, the fixed trunnion member 29 includes (see FIGS. 3 and 5) a pair of vertically and rearwardly extending horizontally spaced arms 53 and 57 which include aligned apertures 59 (See FIG. 3). In addition, the tilting trunnion member 51 includes a pair of vertically and forwardly extending horizontally spaced arms 61 and 63 which are located immediately inwardly adjacent to the arms 53 and 57 of the fixed trunnion member 29. In addition, the arms 61 and 63 of the tilting trunnion member 51 also include respective apertures 65 which are aligned with each other and which are alignable with the apertures 59 in the arms 53 and 57 of the fixed trunnion member 29.

The fixed and tiltable trunnion members 29 and 51 are connected for relative pivotal movement therebetween by horizontally spaced bearing members 67 and 69 which are respectively seen to the left and to the right in FIGS. 3 and 5 and which extend into the adjacently located trunnion arm apertures 59 and 63. The bearing members 67 and 69 respectively include outer flanges 71 and 73 which respectively abut the outer vertical faces of the fixed trunnion member arms 55 and 57. Removal of the flanged bearing members 69 and 71 from the apertures 59 and 63 can be prevented by various means. In the illustrated construction, such removal is prevented by a bolt 77 which extends through the bearing members 67 and 69, which includes a head 79 engaging the outer surface of one of the flanged bearing members 67 and 69, and which has threaded thereon a nut 81 engaging the outer surface of the other of the flanged bearing members 67 and 69. In the disclosed construction, the bolt 77 is located co-axially with the apertures 59 and 63 and co-axially with the tilt axis 42. Alternatively, the flanges 71 and 73 of the bearing members 67 and 69 can be respectively secured by screws or otherwise connected to the outer surfaces of the fixed trunnion member arms 53 and 57.

The steerable propulsion leg 47 can be pivotally connected to the tilt housing 43 by any suitable means. In the illustrated construction, the main bracket 49 includes a downwardly open cylindrical portion 83 which interiorly supports a plurality of bearings 87 rotatably mounting within the cylindrical portion 83 an upwardly projecting portion 89 of the propulsion leg 47.

In addition to the tiltable connection therebetween, the support 17 and the tilt housing 43 are also connected by a flexible, tubular metal bellows 91 which is bolted or otherwise suitably fixed at its respective ends to the intermediate housing 27 of the support 17 and to the main bracket 49 of the tilt housing 43. While other materials can be employed for the bellows, the illustrated construction contemplates use of a stainless steel bellows.

The bellows 91, together with the support 17 and tilt housing 43, provide a flexible enclosure or gear box which contains the pivotal connection of the support 17 and the tilt housing 43, together with a power train extending from the engine (not shown) to the propeller 48 and including (See especially FIG. 3) a reversing transmission 93 for controlling operation of the propeller 48. The bellows enclosure also, at least in part, houses a steering control linkage 95 which controls steering movement of the propulsion leg 47. The bellows enclosure also houses (see FIG. 2) a shock absorber 97 connected between the support 17 and the tilt housing 43. In addition, the enclosure defined between the bellows 91 and the support 17 and the tilt housing 43 provides a container for oil for lubricating the drive train which extends through the support 17 and the tilt housing 43 and which includes the reversing transmission 93, as well as for lubricating the tiltable connection between the support 17 and the tilt housing 43, and the steering control linkage 95.

More specifically with respect to the power train, the support 17 and, specifically, the fixed trunnion member 29 supports bearings 117 rotatably journaling a power or input shaft 119 which extends perpendicularly to the tilt axis 42 and which is adapted to be driven in one rotative direction by an internal combustion engine (not shown).

Rotatably mounted by bearings 121 located in the tilt housing 43 is a drive or output shaft 123 which is adapted to be drivingly connected to the propeller 48 and which extends in perpendicular relation to the tilt axis 42 and in substantially co-planar relation to the input or power shaft 119.

As already noted, the power train also includes the before mentioned reversing transmission 93 which is operable to connect the input shaft 119 to the output shaft 123 so as to selectively drive the propeller 48 in forward or reverse drive and to provide a neutral condition. In addition, the transmission components can be arranged in two different organizations so as to alternatively drive the output shaft 123 at relatively high or low speeds with the same input shaft speed. In FIG. 3, the components are arranged to provide high speed operation of the output or drive shaft 123.

More specifically, while other specific constructions are possible, in the over-all context, the reversing transmission 93 includes three bevel gears mounted co-axially with each other and with the tilt axis 42 and including a relatively large transfer gear 125 which is journaled by a combined thrust and radial bearing 127 mounted on the inner surface of the left bearing member 67. Nested against the transfer gear 125 is a second or smaller gear 129 which is journaled by thrust and radial bearings 131 and 133 respectively located between the second bevel gear 129 and the transfer gear 125. Located in spaced facing relation to the second bevel gear 129 is a third bevel gear 135 which is of the same size as the second bevel gear 129 and which is journaled by a combined thrust and radial bearing 137 supported on the inner surface of the right bearing member 69.

The third bevel gear 135 includes a bore containing a radial bearing 139 supporting a hollow cross or power transfer shaft 141 which is supported in telescopic relation to the bolt 77 and in co-axial relation to the tilt axis 42, which also extends through a bore in the second bevel gear 129, and which extends, at least partially, in a bore in the transfer gear 125 and is fixedly connected to the transfer gear 125 for common rotary movement. Thus, the cross or transfer shaft 141 is mounted co-axially with the tilt axis 42 by the combined thrust and radial bearing 127 supporting the transfer gear 125 and by the radial bearing 139 between the cross shaft 141 and the third bevel gear 135 and by the combined thrust and radial bearing 137 between the third bevel gear 135 and the right bearing member 69.

The third bevel gear 135 also includes, at the outer end of the bore, an inturned flange 143 which supports a thrust bearing 145 engaging the adjacent end of the cross shaft 141.

As a consequence of the foregoing construction, the cross shaft 141 and transfer gear 125 rotate in common while the second and third bevel gears 129 and 135, respectively, are rotatable independently of each other and independently of the assembly of the transfer gear 125 and cross shaft 141.

In addition to the foregoing, the reversing transmission 93 also includes a clutch or means on the second and third bevel gears 129 and 135 and on the cross shaft 141 for selectively connecting and disconnecting the second and third bevel gears 129 and 135 to the cross shaft 141. Various arrangements can be employed, including for instance, reversing mechanisms such as disclosed in my co-pending application Ser. No. 132,401, filed Apr. 8, 1971. In addition, reversing mechanisms of the general type disclosed in my co-pending application Ser. No. 809,465 filed Mar. 10, 1969, can be employed.

In the specifically illustrated construction, such clutch means comprises formation of the cross shaft 141 with a splined portion intermediate the spaced second and third bevel gears 129 and 135 and the provision of a clutch dog 147 which is carried on the splined portion of the cross shaft 141 for common rotary movement with the cross shaft 141 and for axial movement relative to the cross shaft 141 between a forward drive position, a rearward drive position and an intermediate or neutral position.

The means for selectively connecting the spaced bevel gears 129 and 135 to the cross shaft 141 also includes cooperating lug means 149 on each of the opposed faces of the second and third bevel gears 129 and 135 and on each of the surfaces of the clutch dog 147 which face the second and third bevel gears 129 and 135. Accordingly, when the clutch dog 147 is in the forward drive position, the clutch dog 147 is engaged with one of the spaced second and third bevel gears 129 and 135 for common rotation therewith, and when the clutch dog 147 is in the rearward drive condition, the clutch dog 147 is engaged with the other of the second and third spaced bevel gears 129 and 135 for common rotation therewith. Thus, when the clutch dog 147 is engaged with either one of the spaced second and third bevel gears 129 and 135, the engaged one of the spaced second and third bevel gears 129 and 135, the clutch dog 147, the cross shaft 141, and the transfer gear 125, all have common rotation.

As already indicated, the components of reversing mechanism 93 can be alternatively arranged to provide either a relatively high output shaft speed or a relatively low output shaft speed for any given input shaft speed. In the arrangement shown in FIG. 3, the reversing mechanism components are arranged to provide relatively high output shaft speeds. Specifically, the transfer gear 125 is in mesh with a bevel pinion 151 on the input shaft 119 and the spaced bevel gears 129 and 135 are both in mesh with a bevel pinion 153 which is fixed to the output shaft 123 and which has a lesser pitch diameter than the bevel pinion 151.

In the alternative arrangement shown in FIG. 4, the same components are arranged to provide a relatively slow output shaft speed. Specifically, the smaller bevel pinion 153 is mounted on the input shaft 119 and is in mesh with the spaced second and third bevel gears 129 and 135, while the transfer gear 125 is in mesh with the large bevel pinion 151 which is mounted on the output shaft 123. Accordingly, if the input shafts 119 in the embodiment of FIGS. 3 and 4 are driven at the same speed, the output shaft 123 of the embodiment of FIG. 3 rotates at a speed greater than the speed of the output shaft 123 of the embodiment of FIG. 4. Both arrangements employ identical parts which are arrangeable to provide different output speeds in response to the same input speed.

The means for selectively connecting the cross shaft 141 to the spaced bevel gears 129 and 135 further includes means for moving the clutch dog 147 between the forward drive, reverse drive and neutral positions. While other constructions could be employed, in the specifically illustrated construction, the clutch dog 147 includes an external annular groove 155 (See FIG. 2) receiving the forked legs of a shifter lever 157 which is fixed to a clutch actuating shaft 159. In turn, the clutch actuating shaft 159 is rotatably journaled in a bore in the fixed trunnion member 29 and extends in generally parallel relation below and co-planar to the input shaft 110. More specifically, the clutch actuating shaft 159 includes a rearward portion extending within the bellows enclosure and connected to the shifter lever 157 for common pivotal movement and a forward portion 160 extending forwardly of the support 17 and having fixed thereon an operating or actuating lever 161 adapted to be remotely operated. The clutch actuating shaft 159 is biased toward a neutral position by a spring 162 connected, at one end, to the support 17 and connected, at its other end, to the lever 161 at a point spaced from the forward actuating shaft portion. In operation, pivoting of the clutch operating lever 161 causes common pivoting of the clutch actuating shaft 159 which, in turn, causes pivoting of the clutch shifter 157 to move the clutch dog 147 between the neutral position and the positions of respective engagement with the spaced second and third bevel gears 129 and 135.

As already indicated, the bellows enclosure also contains a steering control linkage 95 which is seen best in FIGS. 3 and 6, which is connected to the propulsion leg 47, and which includes an operating lever or member 163 located forwardly of the support 17. More specifically, the steering control linkage 95 includes a gear segment 165 fixed to the upper part of the propulsion leg 47 and in mesh with a pinion 167 fixed on a lower portion of a steering shaft 169 journaled in the tilt housing 43 for rotation about an axis extending radially and perpendicularly from the tilt axis 42 and also including an upper portion 171 extending within the bellows enclosure.

The steering control linkage 95 also includes another steering shaft 173 which is journaled in the support 17 in radially and perpendicularly extending relation to the tilt axis 42 and which includes a portion located forwardly of the support and fixed to the operating member 163 and a portion 175 extending rearwardly into the bellows enclosure.

The rearward portion 175 of steering shaft 173 and the upper portion 171 of the steering shaft 169 are connected within the bellows enclosure by a universal coupling or joint 181 which includes spaced members or elements 183 and 185 respectively extending from the upper steering shaft portion 171 and the rearward steering shaft portion 175. Each of said members 183 and 185 includes respective forked shaped end portions 187 each respectively including (See FIG. 7) an inner concave surface 189 which extends for about 180 degrees and a cross section (see FIG. 8) which tapers outwardly in the direction radially outwardly with respect to the center of the concave surface 189 when taken in any plane extending radially from the concave surface center.

Joining the spaced forked shaped portions 187 is a connecting unit 191 which extends across the tilt axis 42 and which comprises spaced ball-like members 193 and 195 each having a first annular groove 197 with a radially inwardly tapering cross section, which first grooves respectively receive the concavely shaped forked end portions 187 of the members 183 and 185 connected to the steering shafts 169 and 173. The ball-like members 193 and 195 each also include a second annular groove 199 extending at a right angle to the first annular groove 197 and having a radially inwardly tapering cross section.

In addition, the connecting unit 191 includes spaced elongated spaced wedge members 211 and 213 each respectively including, at each end, an end portion 217 including a concave edge surface 219 extending for about 90 degrees and a cross section which tapers outwardly in the direction radially outwardly with respect to the center of the concave surface 219 when taken in a plane extending radially of the concave surface center.

The spaced wedge-shaped members 211 and 213 are arranged in generally co-planar relation with the adjacently located, concavely shaped end portions 217 at one end of each of the wedge members 211 and 213 being received in the second annular groove 199 of one of the ball-like members 193 and 195 and with the adjacently located, concavely shaped end portions 217 at the other end of each of the wedge-shaped members 211 and 213 being received in the second annular groove 199 of the other of the ball-like members 193 and 195.

Means are provided for adjustably connecting the wedge-shaped members 211 and 213 to adjust the interfitting relationship of the forked shaped end portions 187 of the members 183 and 185 and the concavely formed end portions 217 of the wedge-shaped members 211 and 213 in the annular grooves 197 and 199 of the ball-like members 193 and 195. While various arrangements can be employed, in the construction illustrated in FIG. 6, the wedge members 211 and 213 include respective aligned transverse bores, one of which bores is threaded to receive a headed screw 221 extending through the other of the bores, whereby tightening of the screw 221 draws the wedge-shaped members 211 and 213 together to adjustably remove back lash in the universal coupling 181, i.e. to adjust the axial distance between the shafts 169 and 173, that is, the distance between the shafts through the center of the ball-like members 193 and 195.

In operation of the steering control linkage 95, pivotal movement of the actuating or operating member 163 causes pivotal movement of the steering shaft 173 which, in turn, and through the universal coupling 181, causes pivotal movement of the steering shaft 169 which, in turn, causes pivotal movement of the propulsion leg 47 relative to the tilt housing 43.

Shown in FIG. 9 is another embodiment of a universal joint or coupling 227 which can be connected to the steering shafts 169 and 173 and which includes various of the features of the universal coupling 181 just described. As illustrated, the universal coupling 227 connects two shafts 229 and 231 with intersecting axes and with each of the shafts 229 and 231 including a forked shaped end portion 233 having slightly spaced, adjacently extending forks 237 each including a concave surface 239 extending for about 90 degrees and each having a cross section which tapers outwardly in the direction radially outwardly with respect to the center of the concave surface 239 when taken in any plane radially of the concave surface center.

The coupling 227 also includes a connecting unit 241 comprising a single ball-like member 243 having a first annular groove 247 with a radially inwardly tapering cross section which receives the forked shaped end portion 233 of one of the intersecting shafts 229 and 231. The ball-like member 243 also includes a second annular groove 249 which extends at a right angle to the first annular groove 247, which has a radially inwardly tapering cross section, and which receives the forked shaped end portion 233 of the other of the intersecting shafts 229 and 231.

The coupling 227 further includes means for adjusting the back lash between the intersecting shafts 229 and 231. While other arrangements are possible, in the construction illustrated in FIG. 9 and as already indicated, the forks 237 of each fork-shaped end portion 233 are separated by a diametrically extending slot 251 extending into the respective shafts 229 and 231, whereby the forks 237 are provided with a limited amount of flexibility relative to each other. In addition, diametric bores are provided at right angles to the respective slots 251 with the respective bore portions on one side of the respective slots 251 being threaded and receiving respective headed screws 253 which pass through the respective bore portions on the other side of the respective slots 251. Accordingly, tightening of the screws 253 will force the forks 237 together to adjust the interfitting relationship of the fork-shaped end portions 233 in the annular grooves 247 and 249 of the ball-like member 243 to thereby adjustably remove back lash in the coupling 227.

Employment of the coupling 181 including the connecting unit 191 with two ball-like members 193 and 195 as shown in FIG. 6 as compared to the coupling 227 including a single ball-like member 243 as shown in FIG. 9, permits transmission of rotative movement between two shafts over a greater range of angular variation between the axes of the connected shafts. Thus, in the arrangement shown in FIG. 6, the propulsion unit 41 is tiltable over an angle in excess of 60° without adversely affecting the ability of the universal coupling 181 to transmit rotary motion across the tilt axis 42 throughout the tilting range.

Employment of the annular peripheral grooves 197, 199, 247, and 249 on the ball-like members 193, 195, and 243 affords maximum load transmission within a minimum over-all size.

Also at least partially contained in the bellows enclosure is the before mentioned shock absorber 97. While other constructions could be employed, in the illustrated construction shown in FIG. 2, a hydraulic cylinder 261 is pivotally connected to the forward bracket 23 of the support 17 for tilting movement about a transverse axis 263. Included in the cylinder is a piston (not shown) which, in the illustrated construction, is connected to a through piston rod 267 which passes through bearings at both ends of the cylinder 261. The rearward end of the piston rod 267 extends (See FIG. 5) through the bellows enclosure above and between the spaced second and third bevel gears 129 and 135 and is pivotally connected at 269 to an anchor 271 which is provided on the tiltable trunnion member 51 of the tilt housing 43. Suitable porting can be provided within the hydraulic cylinder 261 to control hydraulic fluid flow from one side of the piston to the other during tilting movement of the propulsion unit 41 and so as to absorb shock or energy in response to the violent striking of an underwater obstacle.

The bellows enclosure serves to protect the various mechanisms and components contained therein and, in addition, constitutes a part of a lubricating system and is designed to accommodate a pool of oil and to afford lubrication of the various operating components within the bellows enclosure. In this regard, the tilt housing 43 can include oil seals around the output shaft 123 to prevent loss of lubricating oil. In addition, oil seals can be provided between the support 17 and each of the input shaft 119, the steering shaft 173, and the clutch actuating or control shaft 159. In addition, the connection of the bellows 91 to each of the support 17 and tilt housing 43 is such as to prevent loss of lubricant and thereby to effectively provide for retention in the bellows enclosure of a pool of oil.

Thus, there is disclosed a simplified and compact stern drive unit 11 including the tiltable and steerable propulsion leg 47, as well as the bellows enclosure between the support 17 fixable relative to the boat hull 13 and the tilt housing 43 which supports the steerable propulsion leg 47. The bellows enclosure contains a power train including co-planar input and output shafts 119 and 123 and a transversely arranged reversing transmission 93 co-axial with the tilt axis 42. In addition, the bellows enclosure contains the steering control linkage 95 which extends across the tilt axis 42, as well as shock absorbing means 97. In effect, the bellows enclosure can be regarded as a protective, flexible gearcase which is adapted to contain lubricant so as to insure lubrication of the operating components within the bellows enclosure or flexible gearcase.

Extending exteriorly of the bellows enclosure but within the confines of the wings 31 is one or more flexible water conduits or passages 99. More particularly, the propulsion leg 47 includes a water pump (not shown) which communicates, through suitable passageways (not shown) in the propulsion leg 47 and tilt housing 43, with a port or passage 281 which is located in the tilt housing 43 and which communicates with the flexible water conduit 99. The passageways in the tilt housing 43 and propulsion leg 47 are such that communication is maintained during steering movement of the propulsion leg 47 relative to the tilt housing 43.

The support 17 also includes (See FIGS. 2 and 3) a port or water passage 283 which communicates with the flexible conduit 99 and which is adapted to be connected to the water jacket of the engine (not shown). Thus, provision is made for supplying water to the engine, notwithstanding both tilting and steering of the propulsion leg 47 relative to the support 17.

Located exteriorly of and below the bellows enclosure (See FIG. 2) are trim control means 321 and an exhaust gas passage system 323 for underwater exhaust gas discharge. More particularly, the support 17 includes, at the lower end thereof, a hydraulic cylinder 327 including an extensible ram 329 which is adapted to engage a stop or pad 331 on the tilt housing 43. Suitable hydraulic connections to the cylinder 327 can be employed to adjustably extend and retract the ram 329 to adjust the trim of the tiltable propulsion leg 47. If desired, an electrically driven mechanical arrangement (not shown) including a worm and screw can be employed to adjustably extend and retract the trim controlling ram 329.

With regard to the underwater exhaust gas discharge system 323, the support 17 includes, on each side of the trim control means 321, an exhaust gas opening or port (not shown) which communicates with a resiliently extensible flexible conduit 339 (See FIG. 2) which is mounted on the tilt housing 43 and which, in turn, communicates with exhaust passages (not shown) in the tilt housing 43 and propulsion leg 47, and through such passages, with an underwater exhaust gas discharge outlet 341 (See FIG. 1) in the propeller 48. Other underwater exhaust discharge outlets can also be used. In connection with the underwater exhaust gas discharge system 323, means (not shown) are provided for guiding the resiliently extensible flexible conduits 339 into positions of mating engagement with the exhaust gas openings (not shown) in the support 17 through a range of trim or tilt positions of the propulsion leg 47.

Various of the features of the invention are set forth in the following claims.

What is claimed is:

1. A universal joint comprising first and second members each having a fork-shaped portion including a concave surface, one of said fork-shaped portions including a pair of spaced forks and a slot located between said forks and extending radially outwardly with respect to said concave surface, and means for adjusting the size of said slot to thereby adjust the distance between said forks and to adjust the axial distance between said members, and a connecting unit having a first annular groove receiving said forked portion of one of said first and second members, said connecting unit also having a second annular groove extending at a right angle to said first groove and receiving said forked portion of the other of said first and second members.

2. A universal joint comprising first and second members each having a fork-shaped portion including an inner concave surface and a cross section taken transversely to said concave surface and tapering outwardly in the direction radially outwardly with respect to said concave surface, third and forurth members each having opposite end portions with a concave edge and a cross section taken transversely to said concave edge and tapering outwardly in the direction radially outwardly with respect to said concave edge, fifth and sixth members each having a first annular groove with an inwardly tapering cross section, said first grooves respectively receiving said fork-shaped portions of said first and second members, said fifth and sixth members each also having s second annular groove extending at a right angle to said first groove and with an inwardly tapering cross section, said second grooves respectively receiving said end portions of said third and fourth members, and means adjustably connecting said third and fourth members to each other to adjust the interfitting relationship of said first and second member fork-shaped portions in said first grooves and to adjust the interfitting relationship of said third and fourth member end portions in said second grooves.

3. A universal joint comprising first and second members each having a fork-shaped portion including an inner concave surface, third and fourth members each having opposite end portions with a concave edge, fifth and sixth members each having a first annular groove respectively receiving said fork-shaped portion of said first and second members, said fifth and sixth members each also having a second annular groove extending at a right angle to said first groove and respectively receiving said end portions of said third and fourth members, and means adjustably connecting said third and fourth members to each other.

* * * * *